United States Patent

Higuchi et al.

[11] Patent Number: 6,047,919
[45] Date of Patent: Apr. 11, 2000

[54] ATTACHMENT STRUCTURE ONTO TAPE REEL OF TAPE BODY, ATTACHMENT METHOD THEREOF, DEFORMING APPARATUS FOR TAPE BODY, AND TAPE CASSETTE

[75] Inventors: Shintaro Higuchi; Shinichi Abe; Hiroyuki Honma; Hiroshi Sekimukai; Masanori Abe, all of Miyagi, Japan

[73] Assignee: Sony Corporation, Tokyo, Japan

[21] Appl. No.: 09/131,231

[22] Filed: Aug. 7, 1998

Related U.S. Application Data

[62] Division of application No. 08/704,717, Jan. 15, 1997, Pat. No. 5,850,985.

[30] Foreign Application Priority Data

Jan. 17, 1995 [JP] Japan ..................................... 7-004771
Apr. 28, 1995 [JP] Japan ..................................... 7-105209
Jan. 17, 1996 [WO] WIPO ....................... PCT/JP96/00062

[51] Int. Cl.$^7$ ............................. B65H 19/28; B23P 19/00
[52] U.S. Cl. ....................... 242/586; 242/532.5; 242/345; 29/806
[58] Field of Search ..................................... 242/345, 586, 242/586.2, 532.5; 360/132, 137; 29/806

[56] References Cited

FOREIGN PATENT DOCUMENTS 51-15915 2/1976 Japan .
5-6642 1/1993 Japan .

Primary Examiner—John Q. Nguyen
Attorney, Agent, or Firm—Frommer Lawrence & Haug, LLP.; William S. Frommer

[57] ABSTRACT

A method of attachment for a tape body which supports, on reel hubs, a tape body such as a leader tape, etc. to which a magnetic tape is connected. This attachment structure comprises a tape reel provided with a reel hub which takes cylindrical shape provided at the central portion thereof and a clamp member attached to the reel hub, and a tape body connected to the reel hub in the state where the end portion is supported by the clamp member and wound on the outer circumferential surface of the reel hub. The tape body supported by the reel hub is such that the base end portion side serving as root portion of the drawing side from the reel hub is deformed in the winding direction onto the reel hub following the outer circumferential surface of the reel hub. Deformation of the tape body is carried out by thermal deformation or pressure deformation, or thermal deformation and pressure deformation. The root portion serving as the supporting portion side onto the reel hub of the tape body is deformed following the outer circumferential surface of the reel hub, whereby the tape body is wound in the state closely in contact with the outer circumferential surface of the reel hub.

6 Claims, 14 Drawing Sheets

ATTACHMENT STRUCTURE ONTO TAPE REEL OF TAPE BODY, ATTACHMENT METHOD THEREOF, DEFORMING APPARATUS FOR TAPE BODY, AND TAPE CASSETTE

This is a division of application Ser. No. 08/704,717, filed Jan. 15, 1997, U.S. Pat. No. 5,850,985.

FIELD OF THE INVENTION

This invention relates to a tape body supporting structure and a tape body supporting method for supporting, onto tape reels, a tape body wound between a pair of tape reels rotatably supported within a cassette body, an apparatus for deforming a tape body supported on the tape reels, and a tape cassette within which a pair of tape reels which have supported a tape body are accommodated in the state where they are rotatably supported.

BACKGROUND OF THE INVENTION

Hitherto, there have been used recording and/or reproducing apparatuses for recording and/or reproducing data of information processing equipment by using, as a recording medium, a tape cassette in which a magnetic tape for recording information signals is wound between a pair of tape reels rotatably supported within a cassette body formed by butt-joining an upper half and a lower half.

As a tape cassette used as a recording medium of the recording and/or reproducing apparatuses of this kind, there is a tape cassette having outer (outside) shape substantially the same as that of a tape cassette within which a magnetic tape having tape width caused to be 8 mm used for recording video signals, etc. as an analog signal is accommodated.

The recording and/or reproducing apparatus for recording and/or reproducing data of information processing equipment using, as a recording medium, the tape cassette within which the magnetic tape of which tape width is caused to be 8 mm is accommodated as described above carries out recording and/or reproduction of data in the state where a magnetic tape wound between a pair of tape reels rotatably supported within a tape cassette loaded in this apparatus is caused to be slidably in contact with a rotational magnetic head device while allowing it to undergo constant velocity traveling from one tape reel serving as the supply side toward the direction of the other tape reel serving as the winding side.

In this recording and/or reproducing apparatus, as a system of allowing a magnetic tape to undergo constant velocity traveling, there are a capstan drive system and a reel drive system.

In the capstan drive system, as shown in FIG. 1, a magnetic tape 2 wound extending over a pair of tape reels 1A, 1B rotatably supported within a tape cassette is caused to be put between a capstan 3 rotating at a constant velocity and a pinch roller 4 caused to be in pressure contact with the capstan 3 so that the magnetic tape 2 is caused to undergo constant velocity traveling. In accordance with the capstan drive system, means for controlling tape tension of tension arm, etc. is disposed in a traveling path for the magnetic tape 2 to control tape tension of the traveling magnetic tape 2 to thereby conduct a control so that the magnetic tape 2 is traveled at a constant velocity. In allowing the magnetic tape 2 to undergo constant velocity traveling, a reel drive shaft 6 engaged with the other tape reel 1B serving as the winding side of the magnetic tape 2 of reel drive shafts 5, 6 provided at the recording and/or reproducing apparatus side respectively engaged with a pair of tape reels 1A, 1B is rotationally driven to rotationally operate the other tape reel 1B to allow the magnetic tape 2 to undergo winding operation onto the other tape reel 1B side.

Moreover, in the reel drive system, as shown in FIG. 2, reel drive shaft 6 engaged with the other tape reel 1B serving as the winding side of the magnetic tape 2 of reel drive shafts 5, 6 respectively engaged with a pair of tape reels 1A, 1B of the tape cassette loaded in the recording and/or reproducing apparatus is only rotationally driven to rotationally operate a pair of tape reels 1A, 1B to allow the magnetic tape 2 to undergo constant velocity traveling. In accordance with the reel drive system, in more practical sense, rotational period of the reel drive shaft 6 for allowing the other tape reel 1B to undergo rotational operation so that sum of rotational periods of the tape reel 1A serving as the supply side of the magnetic tape 2 and the other tape reel 1B serving as the winding side of the magnetic tape 2 becomes constant is controlled to thereby control traveling velocity of the magnetic tape 2, thus to realize constant velocity traveling. In accordance with the reel drive system, since the magnetic tape 2 can be traveled without allowing the magnetic tape 2 to be put between the capstan and the pinch roller, the magnetic tape can be easily traveled at a high speed (velocity). Since the reel drive system can easily carry out high speed traveling of the magnetic tape 2, this system is advantageous in the case of carrying out search operation to retrieve desired data recorded on the magnetic tape 2.

In order to realize stable constant velocity traveling of the magnetic tape 2 in this reel drive system, it is necessary to control rotation of the reel drive shaft 6 for rotationally operating the other tape reel 1B serving as the winding side so that sum of rotation periods of the tape reel 1A serving as the supply side of the magnetic tape 2 and the other tape reel 1B serving as the winding side of the magnetic tape 2 precisely becomes constant in accordance with winding quantity of the magnetic tape 2 wound on the respective tape reels 1A, 1B. Meanwhile, in the case where the magnetic tape 2 is in a deformed state such that a projection is caused to take place at a portion of the circumferential direction thereof when the magnetic tape 2 is wound with respect to respective tape reels 1A, 1B, even if there is the state where rotations of respective tape reels 1A, 1B are precisely controlled, any error would take place in the velocity of tape traveling. Namely, the reason why such unfavorable phenomenon takes place is that when the winding diameter with respect to respective tape reels 1A, 1B of the magnetic tape 2 is deformed at a portion in the circumferential direction thereof, winding quantity with respect to the tape reel 1B of the drawing or winding side from the tape reel 1A of the supply side of the magnetic tape 2 corresponding to quantities of rotation of respective tape reels 1A, 1B would be changed.

As the tape reel 1A or 1B of the tape cassette used in a recording and/or reproducing apparatus as described above, tape reel constituted as shown in FIGS. 3 and 4 is known.

In the tape reel 1A or 1B, a cylindrical reel hub 11 with which the reel drive shaft provided at the recording and/or reproducing unit side is engaged is provided at the central portion, and reel flanges 12 for supporting side edge of the magnetic tape 2 wound on the outer circumferential surface of the reel hub 11 to adjust the winding shape (put the winding shape in order) are integrally provided at both upper and lower ends of the reel hub 11.

The magnetic tape 2 adapted so that information signals are recorded thereon, which is wound on the tape reels 1A, 1B, is connected to a leader tape 13 for connection, and is connected to the reel hub 11 through the leader tape 13. A tape body 14 wound on the tape reels 1A, 1B is comprised of a connection body of the leader tape 13 and the magnetic tape 2.

At the outer circumferential portion of the reel hub 11, a fitting recessed portion 16 into which a clamp member 15 is fitted is formed. Further, the leader tape 13 to which the magnetic tape 2 is connected is fitted into the fitting recessed portion 16 along with the clamp member 15 in the state where the end portion side thereof is wound on the circumferential surface of the clamp member 15, whereby the leader tape 13 is caused to be put between the clamp member 15 and the fitting recessed portion 16 so that it is supported by the reel hub 11.

At this time, the intermediate (middle) portion of the end portion side of the leader tape 13 is supported by the clamp member 15, whereby the free end 13a side and the connecting portion 13b side of the magnetic tape 2 are respectively projected toward the outer circumferential surface 11a side of the reel hub 11 from the both sides of the clamp member 15. The outer circumferential surface 11a of the reel hub 11 serves as winding surface of the tape body 14.

Meanwhile, since the leader tape 13 is provided with a view to providing protection of fragile magnetic tape 2 to prevent occurrence of trouble or failure such as cutting, etc. to securely realize connection to the tape reels 1A, 1B, the leader tape 13 is formed by synthetic resin material having large mechanical strength as compared to the magnetic tape 2. The synthetic resin material having large mechanical strength has high rigidity and is difficult to be easily deformed. The leader tape 13 having high rigidity as stated above is adapted so that the middle portion of the free end side is supported by the clamp member 15 as shown in FIG. 3, root portions 17, 18 which are the base end portion side supported by the reel hub 11 of the free end portion 13a side and the connecting portion 13b side respectively projected toward the outer circumferential surface 11a side of the reel hub 11 from the both sides of the clamp member 15 are projected substantially vertically to the outer circumferential surface 11a as shown in FIG. 4. When the leader tape 13 is extended onto the outer circumferential surface of the clamp member 15 in this state and is further wound in a direction indicated by arrow $R_1$ in FIGS. 4 and 5 in the state where a fixed tension is rendered so as to overlap on the free end 13a, the root portion 17 of the free end 13a side and the root portion 18 of the connecting portion 13b side are swollen so that they are projected toward the outward from the outer circumferential surface 11a of the reel hub 11. This is because the root portions 17, 18 of the leader tape 13 having high rigidity projected from the both sides of the clamp member 15 would be only curved in the state stretched from the outer circumferential surface 11a without undergoing deformation following the outer circumferential surface 11a of the reel hub 11 by the leader tape 13 wound on these root portions 17, 18 in the state where a fixed tape tension is rendered.

Since the leader tape 13 having high rigidity supported on the reel hub 11 by the clamp member 15 as described above is adapted so that the root portion 18 of the connecting portion 13b side is only curved in the state stretched from the outer circumferential surface 11a without undergoing deformation following the outer circumferential surface 11a of the reel hub 11, a gap $S_1$ takes place between the leader tape 13 and the clamp member 15 in the vicinity of the point $A_1$ shown in FIG. 5 in the vicinity of the root portion 18. Thus, there takes place a projection projected toward the outward of the outer circumferential surface 11a by that gap $S_1$. In addition, also at the root portion 17 of the free end 13a side, a gap $S_2$ similarly takes place between the leader tape 13 and the clamp member 15 also in the vicinity of the point $C_1$ shown in FIG. 5 in the vicinity of the root portion 17. As a result, there takes place a projection projected toward the outward of the outer circumferential surface 11a by that gap $S_2$.

When projection takes place at the root potions 17, 18 projected from the both sides of the clamp member 15 as described above, the magnetic tape 2 wound on the leader tape 13 would be also wound following the projection. Namely, the magnetic tape 2 would be wound in the eccentric state where there takes place any unevenness in the winding diameter in such a manner that the winding center is not caused to be in correspondence with center of the tape reels 1A, 1B. Further, when the magnetic tape 2 is preserved for a long time in the state where winding shape onto the reel hub 11 thereof is deformed, any deformation may take place in the magnetic tape 2 in dependency upon the state of preservation.

When any deformation takes place in the magnetic tape 2 as stated above, contact state between the magnetic tape 2 and the rotational magnetic head unit of the apparatus side does not become constant when loaded into the recording and/or reproducing apparatus to carry out recording and/or reproduction of data. When the deformed portion of the magnetic tape 2 reaches the portion on the rotational magnetic head unit, the magnetic tape 2 floats from the rotational magnetic head unit so that the magnetic tape 2 and the magnetic head are greatly spaced therebetween. As a result, this gives rise to missing, etc. of information signals subject to recording and/or reproduction. Thus, it becomes impossible to carry out recording and/or reproduction of information signals with satisfactory recording and/or reproduction characteristic.

Further, in the case where a tape cassette within which magnetic tape 2 caused to be partially deformed is accommodated is loaded into the recording and/or reproducing apparatus employing the reel drive system to carry out traveling operation of the magnetic tape 2, since the winding diameter of the magnetic tape 2 changes at the deformed portion, any change takes place in the traveling velocity of the magnetic tape 2. Namely, as the result of the fact that winding diameter with respect to respective tape reels 1A, 1B of the magnetic tape 2 changes at a portion in the circumferential direction, there changes winding quantity with respect to the tape reel 1B of the drawing or winding side from the tape reel 1A of the supply side of the magnetic tape 2 corresponding to rotation quantities of respective tape reels 1A, 1B. Thus, linear velocity of the magnetic tape 2 would be varied. When traveling velocity of the magnetic tape 2 has been varied in the reel drive system, it becomes impossible to carry out recording and/or reproduction of data with satisfactory recording and/or reproduction characteristic.

OBJECT AND SUMMARY

An object of this invention is to provide an attachment structure onto a tape reel of a tape body, an attachment method thereof, and a tape cassette using such an attachment structure which can wind a tape body such as magnetic tape, etc. on which information signals are recorded without allowing it to undergo deformation.

Another object of this invention is to provide an attachment structure onto a tape reel of a tape body, an attachment method thereof, and a tape cassette using such an attachment structure which can wind a leader tape which is a connecting tape body having high rigidity higher than that of a magnetic tape, to which the magnetic tape is connected, wound on the tape reel onto the outer circumferential surface of the reel hub without allowing projecting portion from the outer circumferential surface of the reel hub to take place to precisely concentrically wind the magnetic tape connected to the leader tape without allowing it to be eccentric with respect to the tape reel.

A further object of this invention is to provide a deforming apparatus for a tape body which can easily realize an attachment structure onto a tape reel of a tape body which can wind the tape body such as magnetic tape, etc. without allowing the tape body to undergo deformation.

A still further object of this invention is to provide a deforming apparatus for a tape body which can securely deform, following the outer circumferential surface of the reel hub, a leader tape which is a connecting tape body, to which a magnetic tape supported is connected, on the reel hub.

An attachment structure onto a tape reel of a tape body according to this invention proposed in order to attain objects as described above comprises a tape reel provided with a reel hub which takes a cylindrical shape provided at the central portion and a clamp member attached to the reel hub, and a tape body connected to the reel hub in the state where the end portion thereof is supported by the clamp member and wound on the outer circumferential surface of the reel hub, wherein the base end portion side of the drawing side from the reel hub of the tape body is deformed in a winding direction onto the reel hub following the outer circumferential surface of the reel hub.

In this case, deformation of the tape body is carried out by thermal deformation or pressure deformation.

Moreover, a method for attachment onto a tape reel of a tape body according to this invention, comprises the steps of attaching a clamp member on a reel hub provided at the central portion of the tape reel, allowing the reel hub to support thereon the end portion of the tape body wound on the outer circumferential surface of the reel hub, squeezing or drawing the base end portion side of the supporting portion side onto the reel hub of the tape body while pressing it at a constant pressure to the reel hub side by a pressing member, pressing or holding the base end portion side of the tape body onto the outer circumferential surface side of the reel hub for a predetermined time in the state where the base end portion side of the tape body is heated to deform the tape body in a winding direction of the reel hub following the outer circumferential surface of the reel hub.

When the tape body is caused to undergo deformation, the tape reel is rotated while pressing, to the reel hub side, by a pressing member, the position spaced from the base end portion of the tape body supported on the reel hub by the clamp member to squeeze or draw the base end portion of the tape body.

The deforming apparatus for tape body according to this invention which deforms the tape body supported on the reel hub of the tape reel essentially comprises a pair of reel tables on which a pair of tape reels which support respective end portions of the tape body by clamp members attached on the reel hubs provided at the central portions are respectively mounted, a reel table pressing operation mechanism for allowing one reel table to undergo relative movement with respect to the other reel base and for rotating it, a heating member disposed in a manner opposite to movement direction of the reel table pressing operation mechanism and formed so as to take a shape of curved surface defined as a recess-shaped portion in correspondence with curvature of the outer circumferential surface of the reel hub of the front end surface side, and a biasing member for rotationally biasing, in directions opposite to each other, a pair of tape reels respectively mounted on the pair of reel tables.

In addition, a tape cassette according to this invention comprises a cassette body, a pair of tape reels each provided at the central portion thereof with a reel hub with which a reel drive shaft is engaged, and rotatably supported on the cassette body, and a tape body having respective end portions each supported by a clamp member attached to the reel hub and wound between the pair of tape reels, wherein the tape cassette is provided with a configuration in which the base end portion side of the drawing side from the reel hub of at least one tape reel of the tape body is deformed in a winding direction onto the reel hub following the outer circumferential surface of the reel hub.

Still more further objects of this invention and advantages realized by this invention will become more apparent from the description of more practical embodiments which will be described below with reference to the attached drawings.

DETAILED DESCRIPTION OF CERTAIN PREFERRED EMBODIMENTS OF THE INVENTION

More practical embodiments of this invention will now be described with reference to the attached drawings.

Figure 1:
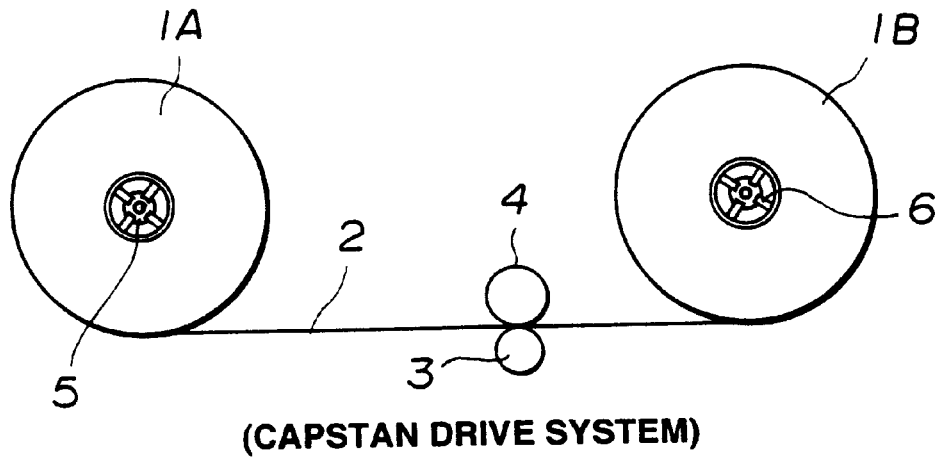
FIG. 1 is a schematic diagram showing traveling operation state of magnetic tape of a recording and/or reproducing apparatus employing the capstan drive system.
Figure 2:
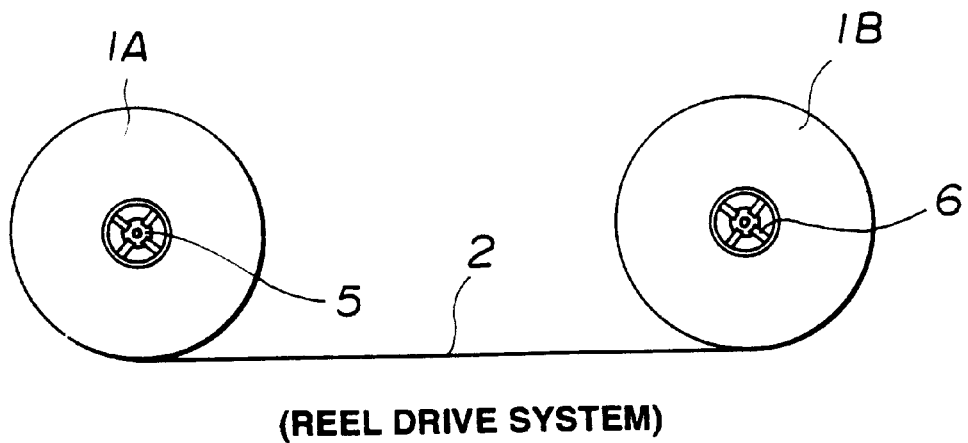
FIG. 2 is a schematic diagram showing traveling operation state of magnetic tape of a recording and/or reproducing apparatus employing the reel drive system.
Figure 3:
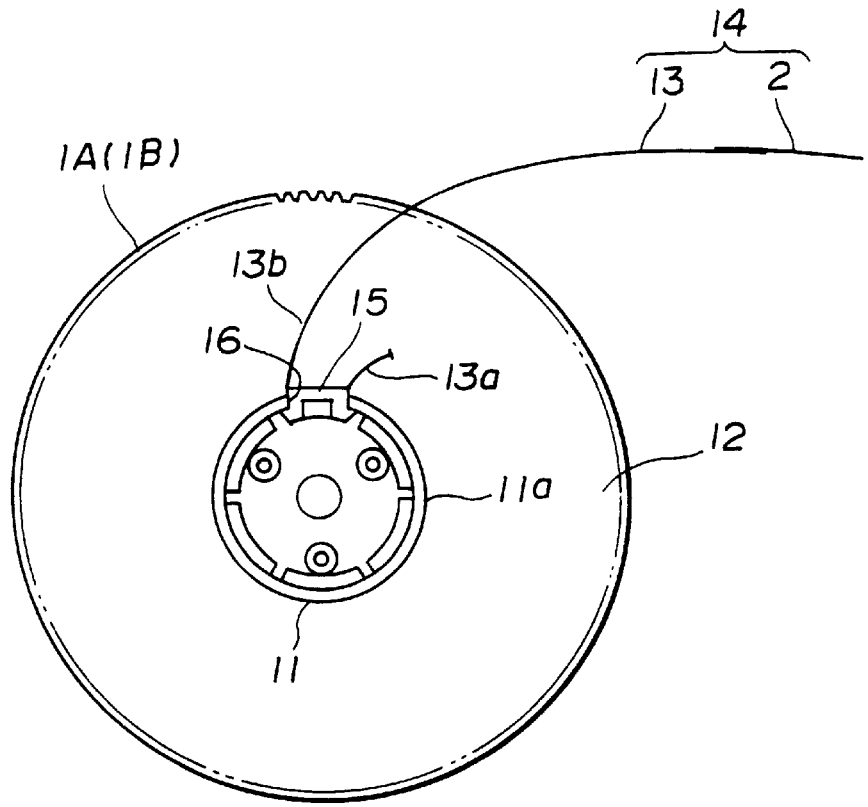
FIG. 3 is a plan view showing a conventional tape reel in the state where leader tape is supported on reel hub.
Figure 4:
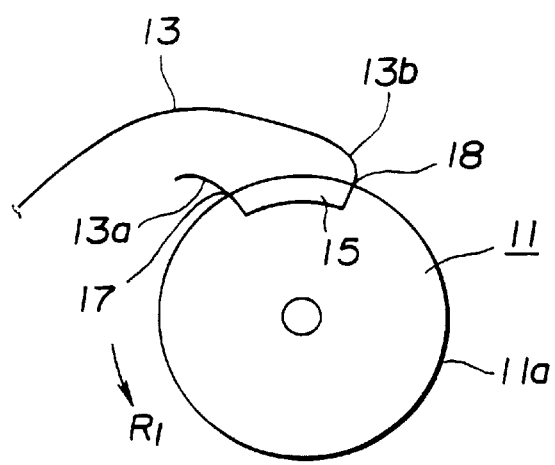
FIG. 4 is a plan view showing leader tape supported on reel hub.
Figure 5:
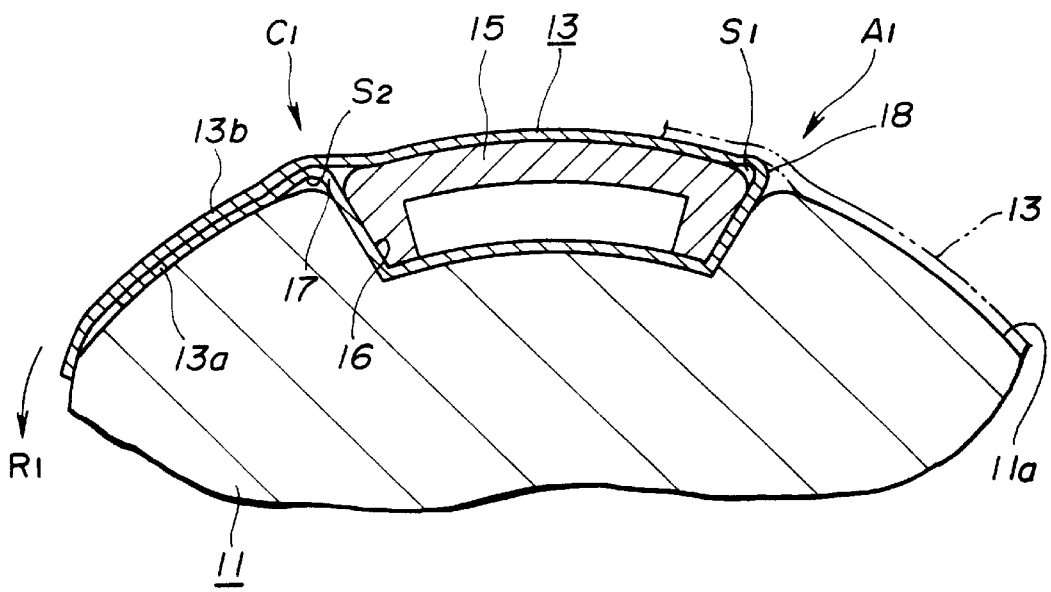
FIG. 5 is an essential part plan view showing the state where leader tape is supported on reel hub through clamp member.
Figure 6:
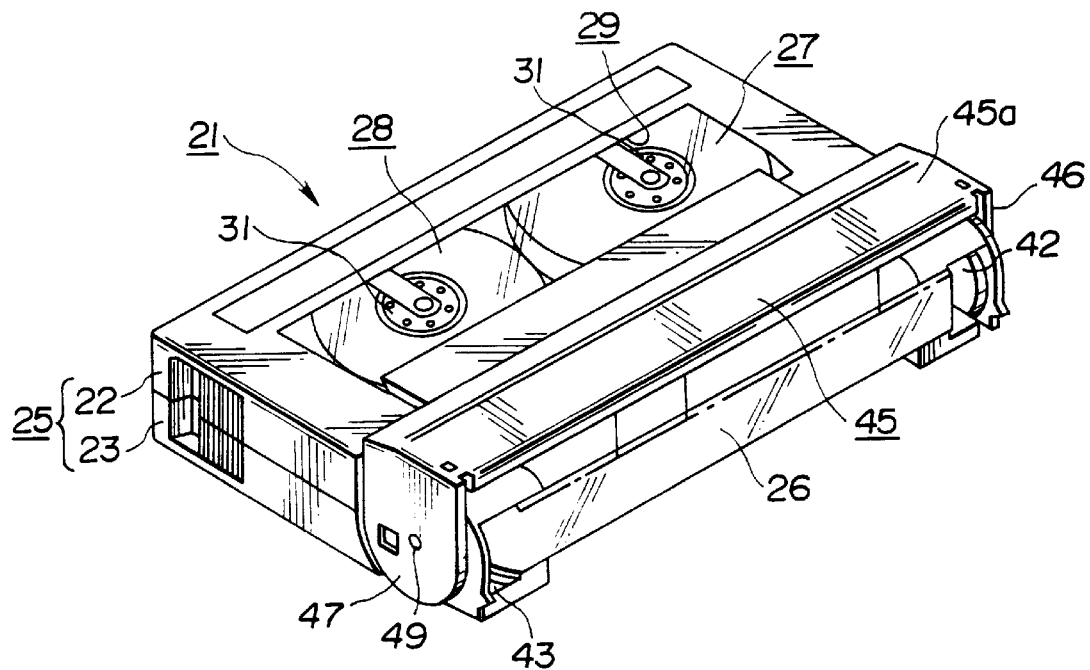
FIG. 6 is a perspective view showing a tape cassette according to this invention.
Figure 7:
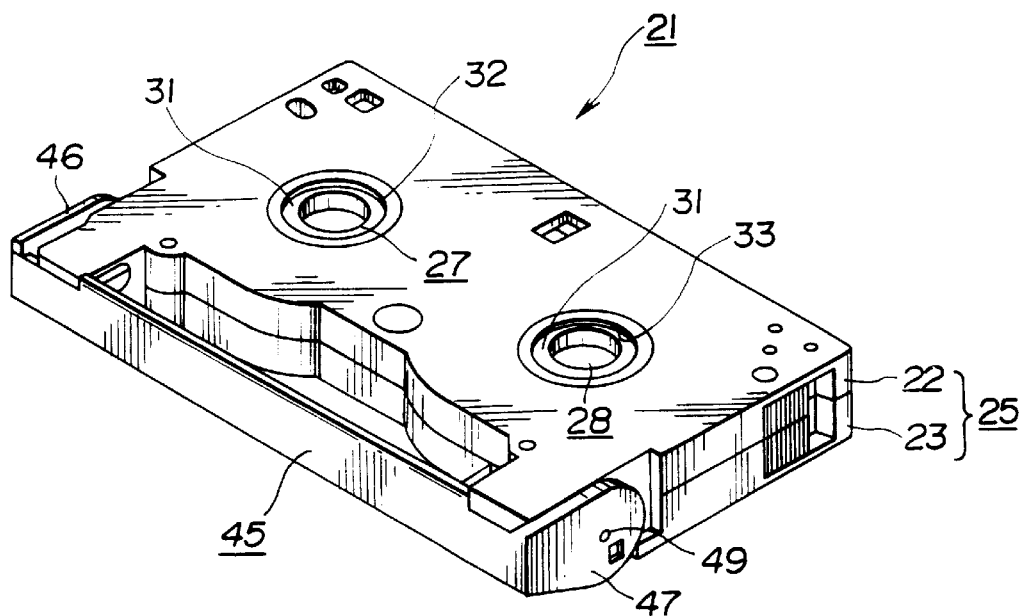
FIG. 7 is a perspective view showing the bottom surface side of the tape cassette.
Figure 8:
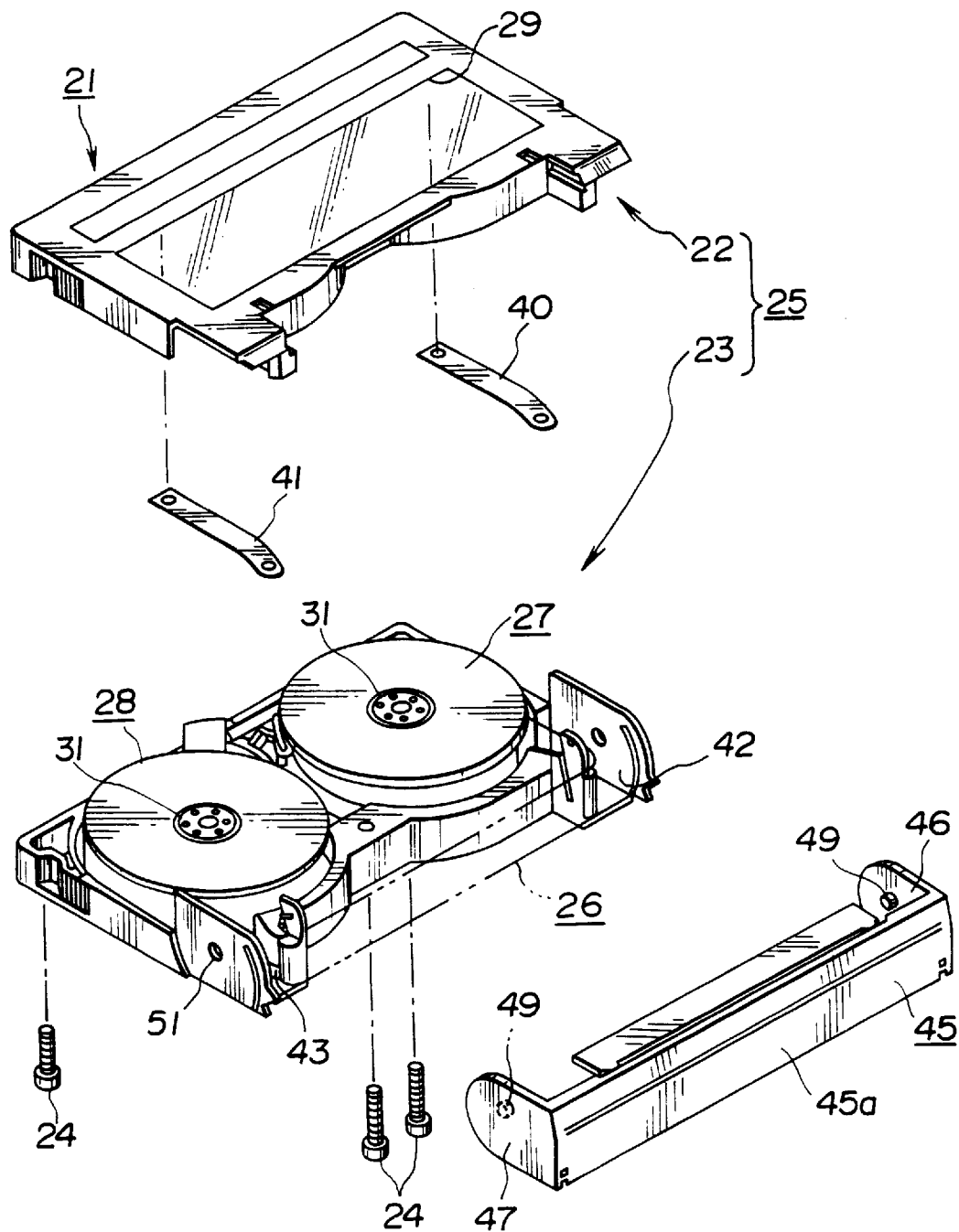
FIG. 8 is an exploded perspective view of the tape cassette.

A tape cassette 21 according to this invention to which a supporting structure for tape body according to this invention is applied will be described below. This tape cassette 21 includes, as shown in FIGS. 6, 7 and 8, a cassette body 25 in which an upper half 22 and a lower half 23 are butted to each other and connected by means of plural fixing screws 24. Within the cassette body 25, a pair of tape reels 27, 28 on which a magnetic tape 26 on which information signals such as data information, etc. used in information processing equipment such as computer, etc. are recorded is wound in the state across these tape reels are rotationally accommodated. One of these tape reels 27, 28 serves as the supply side of the magnetic tape 26, and the other is used as the winding side of the magnetic tape 26.

The cassette body 25 is provided, as shown in FIG. 6, with an indication window 29 which takes rectangular shape at the upper half 22 constituting the upper surface portion, and the state of the magnetic tape 26 wound between a pair of tape reels 27, 28 accommodated within the cassette body 25 is permitted to undergo visual observation through the indication window 29. Moreover, at the lower half 23 constituting the bottom surface portion of the cassette body 25, as shown in FIG. 7, there are provided reel drive shaft insertion holes 32, 33 through which there are inserted reel drive shafts of the recording and/or reproducing apparatus side, which allow portions of reel hubs 31, 31 provided at the central portions of respective tape reels 27, 28 to be faced to the outward and are engaged with reel hubs 31, 31 of the respective tape reels 27, 28 to rotationally operate these tape reels 27, 28.

Figure 9:
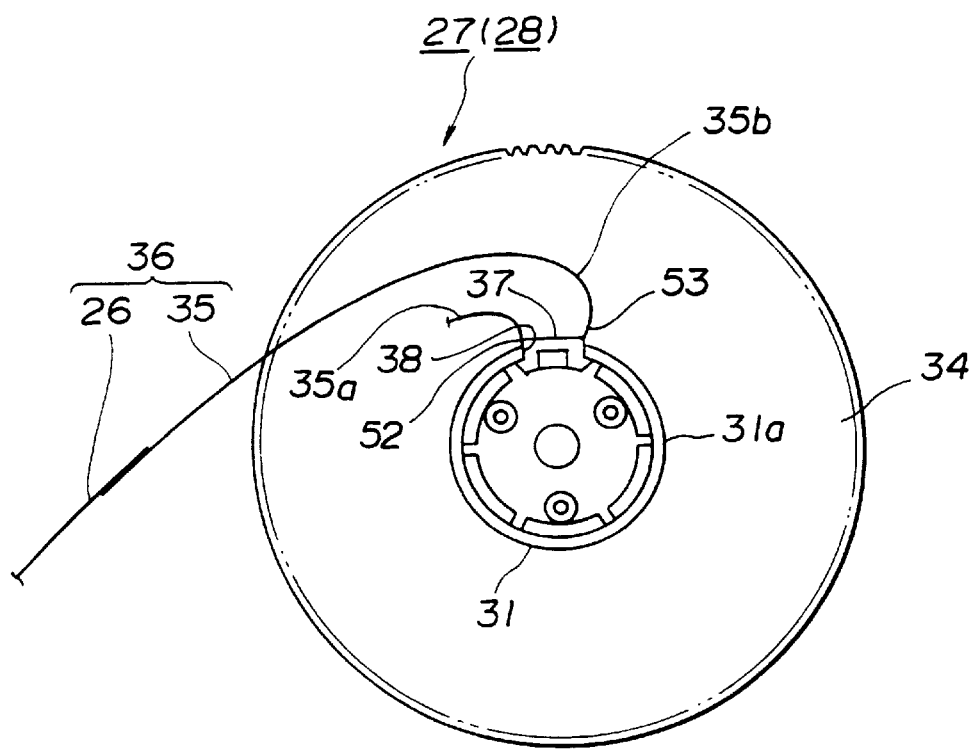
FIG. 9 is a plan view showing the state where leader tape is supported through clamp member on reel hub.

A pair of tape reels 27, 28 used in this tape cassette 21 are formed by the same configuration. Similarly to the previously described conventional tape reel, as shown in FIG. 9, reel hub 31 which takes cylindrical shape with which the reel drive shaft is engaged is provided at the central portion, and reel flanges 34 are integrally provided at both upper and lower ends of the reel hub 31. The magnetic tape 26 wound extending over these tape reels 27, 28 is connected to a leader tape 35 for connection, and is connected to the reel hub 31 through the leader tape 35. Accordingly, a tape body 36 wound between a pair of tape reels 27, 28 is comprised of a connecting body of the magnetic tape 26 and the leader tape 35.

Moreover, at the outer circumferential portion of the reel hub 31, a fitting recessed portion 38 into which a clamp member 37 is fitted is formed. Further, the leader tape 35 which connects the magnetic tape 26 is fitted into the fitting recessed portion 38 along with the clamp member 37 in the state where the end portion side is wound on the circumferential surface of the clamp member 37, whereby the leader tape 35 is supported on the reel hub 31 in the state put between the clamp member 37 and the fitting recessed portion 38.

A pair of tape reels 27, 28 on which the magnetic tape 26 connected through leader tape 35 is wound as described above are rotatably accommodated within the cassette body 25 by fitting the base end portion sides of reel hubs 31, 31 into reel drive shaft insertion holes 32, 33 to support them. The tape reels 26, 27 accommodated within the cassette body 25 are adapted so that the rotational center portions of the upper end side of the reel hubs 31, 31 are pressed and supported as shown in FIG. 8 to the lower half 23 side by reel pressing springs 40, 41 attached to the inside surface of the upper half 22. The tape reels 26, 27 supported by reel pressing springs 40, 41 in this way are rotatably supported within the cassette body 25 in the state where shaking in the upper and lower directions is prevented.

Moreover, the tape body 36 including the magnetic tape 26 wound between a pair of tape reels 26, 27 is drawn out toward the outward of the cassette body 25 through opening portions 42, 43 for drawing of tape provided on the both sides of the front side of the cassette body 25. The tape body 36 drawn out toward the outward of the cassette body 25 is traveled extending over a pair of tape reels 26, 27 along the front portion of the cassette body 25.

At the front portion side where the tape body 26 is traveled in the extended state of the cassette body 25, a front cover 45 for opening/closing the front portion is rotatably attached. This front cover 45 is rotatably attached on the cassette body 25 by allowing support shafts 49 projected on rotational pieces 46, 47 provided on the both sides of a cover plate 45a which covers the front side of the cassette body 25 to be pivotally supported through engagement holes 50, 51 provided on the both sides opposite to each other of the cassette body 25, whereby the front cover 45 is rotatably supported on the cassette body 25.

Since the leader tape 35 supported by the clamp member 37 on a pair of tape reels 26, 27 accommodated within the tape cassette 21 constituted as described above is provided for the purpose of providing protection of fragile magnetic tape 26 to prevent occurrence of trouble or failure such as cutting, etc. to securely carry out connection to tape reels 27, 28, the leader tape 35 is formed by synthetic resin material having mechanical strength greater than that of the magnetic tape 26. The synthetic resin material having large mechanical strength has high rigidity and is difficult to be deformed. The leader tape 35 having high rigidity as stated above is adapted so that when the middle portion of the free end side is supported by the clamp member 37 as shown in FIG. 9, root portions 52, 53 which are the base end portion of the supporting portion side to the reel hub 31 of the free end 35a side and the connecting portion 35b side respectively projected toward the outer circumferential surface 31a side serving as the winding surface of the tape body 36 of the reel hub 31 from the both sides of the clamp member 15 are projected substantially vertically to the outer circumferential surface 31a.

In view of the above, in this invention, in order that the leader tape 35 is wound in the state tightly in contact with the outer circumferential surface 31a of the reel hub 31, root portions 52, 53 of the leader tape 35 projected substantially vertically to the outer circumferential surface 31a are deformed following the outer circumferential surface 31a of the reel hub 31.

Figure 10:
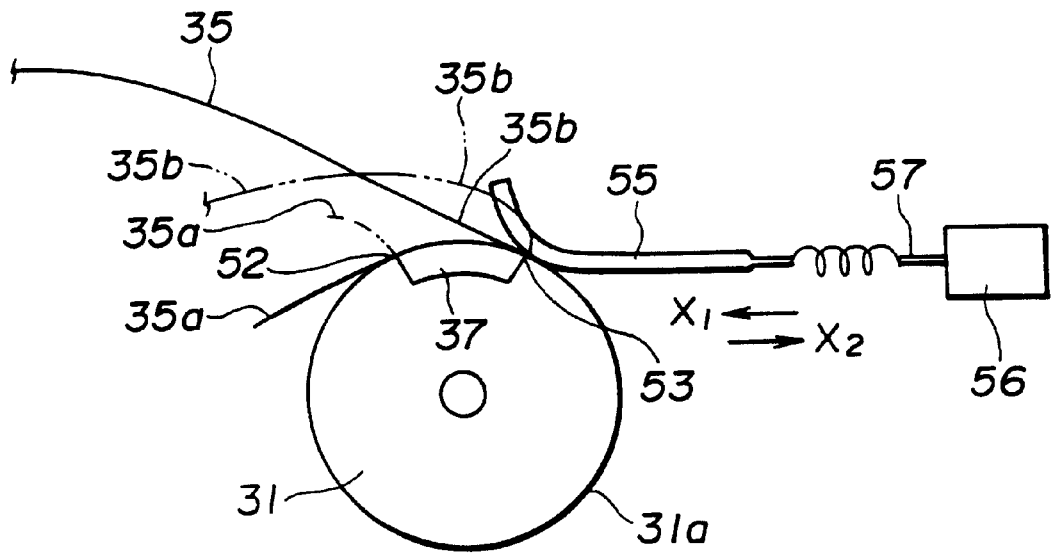
FIG. 10 is a plan view showing the state where leader tape supported on reel hub is caused to undergo deformation.

In order to deform the base end portion of the supporting portion side to the reel hub 31 of the leader tape 35, i.e., root portions 52, 53 drawn out from the clamp member 37 following the outer circumferential surface 31a of the reel hub 31, as shown in FIG. 10, a heater 55 as a heating body is caused to be in contact with the root portions 52, 53 of the leader tape 35 projected toward the both sides of the clamp member 37 to heat such portions to deform them in such a manner that bending peculiarity is rendered following the outer circumferential surface 31a of the reel hub 31. At this time, deformation direction of the root portions 52, 53 of the leader tape 35 is caused to be winding direction to the reel hub 31 of the leader tape 35.

Meanwhile, in order to deform the root portions 52, 53 of the leader tape 35 following the outer circumferential surface 31a of the reel hub 31, it is necessary to advance and withdraw the heater 55 along the outer circumferential surface 31a of the reel hub 31. In view of the above, the heater 55 is connected to a plunger rod 57 of a solenoid plunger 56, and is supported so that it is advanced and withdrawn in the directions indicated by arrows $X_1$ and $X_2$ in FIG. 10.

Further, it is desirable that temperature in thermally deforming the root portions 52, 53 of the leader tape 35 is about 60 to 100° C. to such a degree that bad influence such as damage, etc. is not exerted on the reel hub 31 formed by synthetic resin.

In order to deform the root portions 52, 53 of the leader tape 35 following the outer circumferential surface 31a of the reel hub 31, such a deformation may be carried out by a pressure deformation to apply pressure to the root portions 52, 53 to deform them without carrying out heating. In accordance with the pressure deformation, the root portions 52, 53 of the leader tape 35 are caused to be in pressure contact with the outer circumferential surface 31a side of the reel hub 31 by a pressure application member to deform those root portions.

It is to be noted that, in order to deform the root portions 52, 53 of the leader tape 35 following the outer circumferential surface 31a of the reel hub 31, heating deformation and pressure (application) deformation may be used in combination.

Figure 11:
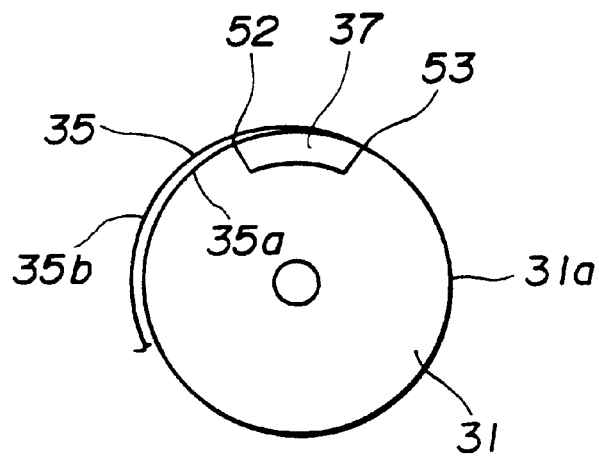
FIG. 11 is a plan view of reel hub portion showing the state where leader tape is deformed.

When the root portions 52, 53 of the leader tape 35 are deformed following the outer circumferential surface 31a of the reel hub 31 by heating or application of pressure, the leader tape 35 is wound following the outer circumferential surface 31a of the reel hub 31 without allowing projecting portions to take place on the both sides of the clamp member 37 as shown in FIG. 11. Accordingly, it is possible to precisely concentrically wind the magnetic tape 26 connected to the leader tape 35 on the leader tape 35 in the state where it has correct winding shape concentrically with the reel hub 31 on the outer circumferential surface 31a of the reel hub 31. Thus, there is no possibility that any deformation is not caused to take place at a portion in the circumferential direction of the reel hub 31.

Figure 12:
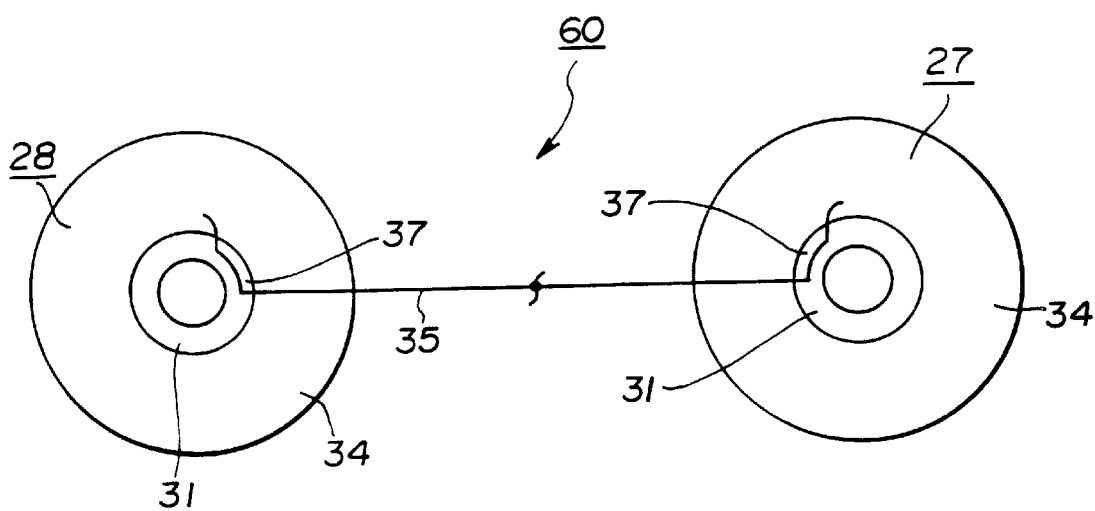
FIG. 12 is a plan view showing the state where leader tape is connected between a pair of tape reels.

Meanwhile, in order to wind the magnetic tape 26 on the pair of tape reels 27, 28 used in the above-described tape cassette 21, it is sufficient to connect leader tape 35 to which magnetic tape 26 is connected between a pair of tape reels 27, 28 as shown in FIG. 12. Namely, there is prepared an assembly (assembling body) 60 in which both end portions of a single leader tape 35 are respectively connected to reel hubs 31, 31 of respective tape reels 27, 28 by clamp members 37, 37.

The leader tape 35 of the assembling body 60 is cut at the central portion in order to connect the magnetic tape 26. As the result of the fact that the magnetic tape 26 is connected between end portions of leader tapes 35, 35 supported on the respective tape reels 27, 28 side, tape body 36 wound between a pair of tape reels 27, 28 is constituted. This tape body 36 is wound onto one tape reel 28 serving as the supply side. As stated above, the magnetic tape 26 is connected between leader tapes 35 to wind the magnetic tape 26 onto one tape reel 28, whereby a pair of tape reels 27, 28 on which tape body 36 accommodated within the tape cassette 21 is wound are constituted.

In this case, it is desirable to carry out deformation for allowing root portions 52, 53 of the leader tape 35 projected substantially vertically to the outer circumferential surface 31a of the reel hub 31 to follow the outer circumferential surface 31a of the reel hub 31 in the state connected between a pair of tape reels 27, 28 before the magnetic tape 26 is connected. This is because the magnetic tape 26 connected to the leader tape 35 is prevented from being damaged, and the leader tape 35 is permitted to easily undergo deformation.

In view of the above, a deforming apparatus 61 for tape body according to this invention which applies deformation to the leader tape 35 (allows the leader tape 35 to undergo deformation) of the tape reel assembly 60 in which a pair of tape reels 27, 28 are connected to each other by the single leader tape 35 will now be described.

Figure 13:
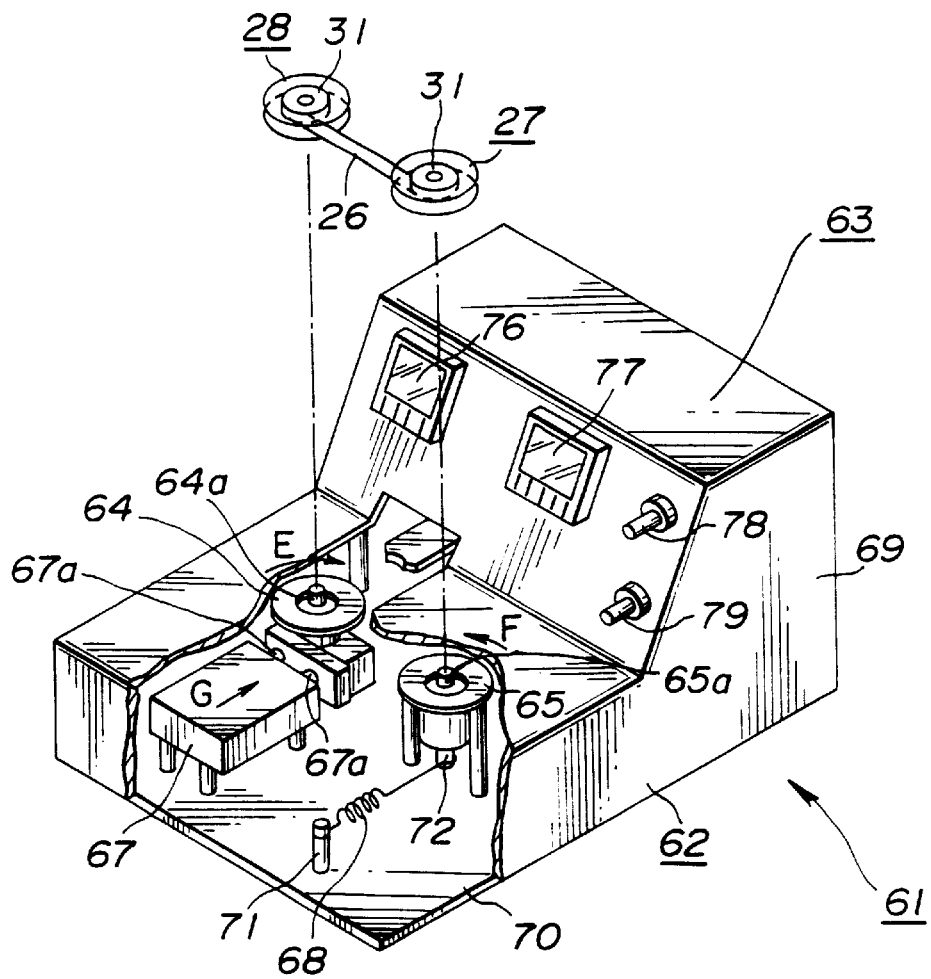
FIG. 13 is a perspective view showing a deforming apparatus for allowing leader tape supported on reel hub to undergo deformation.

This deforming apparatus 61 for tape body is adapted as shown in FIG. 13 so that the both end portions of the leader tape 35 are supported on reel hubs 31 through clamp members 37, assembling body 60 of a pair of tape reels 27, 28 connected by leader tape 35 is mounted, and the front end portion of the heater block is placed in the state caused to be in pressure contact, at a fixed pressure, with the outer circumferential surface of corresponding reel hub 31 of tape reels 27, 28 constituting the mounted assembling body 60 to rotate the pair of tape reels 27, 28 in the same direction to trace the outer circumferential surface of the reel hub 31 to squeeze the root portions 52, 53 supported by the clamp member 37 of leader tape 35, and to apply a predetermined temperature for a predetermined time to deform them.

Namely, the deforming apparatus 61 for tape body according to this invention includes, as shown in FIG. 13, a reel mounting portion 62 in which the tape reel assembly body 60 is mounted and a control portion 63.

The reel mounting portion 62 includes a first reel table 64 on which one of a pair of tape reels 27, 28 constituting the tape reel assembling body 60, which serves as the tape winding side, is mounted, and a second reel table 65 on which the other tape reel is mounted. This reel table mounting portion 62 is provided with a heater block 66 disposed in a manner opposite to the first reel table 64, and a cylinder portion 67 for advancing and withdrawing the first reel table 64 with respect to the heater block 66 by control of air pressure of compressed air to the heater block side, and rotationally operating the first reel table 64. Further, the second reel table 65 is rotationally biased by an extension (tensile) spring 68 in a direction indicated by arrow F in FIG. 13 which is opposite direction to the rotation direction which is a direction indicated by arrow E in FIG. 13 rotationally operated after the first reel table 64 is caused to be in pressure contact with the heater block 66 and is supported on the heater block 66 by the cylinder portion 67. This extension spring 68 is stretched between a supporting pin 71 vertically provided on a bottom plate 70 of a housing 69 constituting the apparatus body of the deforming apparatus 61 and a holding pin 72 projected at the eccentric position of the base end portion side of the second reel table 65 to thereby rotationally bias the second reel table 65 in the direction indicated by arrow F in FIG. 13.

Figure 14:
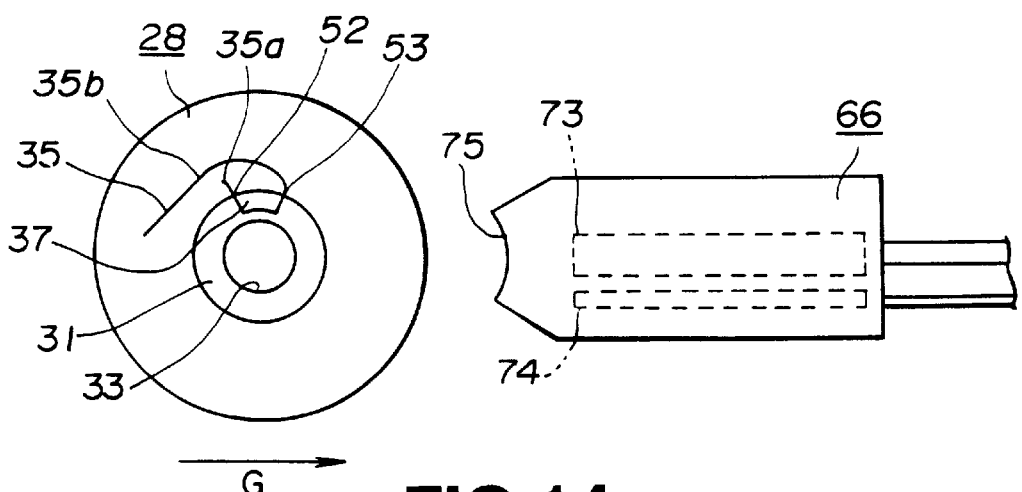
FIG. 14 is a plan view showing the state where tape reel is advanced to the heater block side in order to allow leader tape supported on reel hub to undergo deformation.

Further, the heater block 66 includes therewithin, as shown in FIG. 14, a heater 73 for heating the front end portion and a temperature sensor 74, wherein the front end portion is formed tapered. Moreover, the front end surface of the heater block 66 is caused to be a contact portion 75 with respect to the outer circumferential surface 31a of the reel hub 31 of the tape reel 27 serving as the winding side mounted on the first reel table 64. This contact portion 75 is formed as a recessed curved surface having the same curvature as that of the outer circumferential surface 31a of the reel hub 31 which takes a cylindrical shape, and is formed so as to have thickness substantially equal to the width of the leader tape 35 wound on the outer circumferential surface 31a of the reel hub 31. Namely, the contact portion 75 is formed so as to have a shape such that it is in contact with the outer circumferential surface 31a following the outer circumferential surface 31a of the reel hub 31 to press the entire width of the leader tape 35. Moreover, since the contact portion 75 is a portion for rendering bending deformation to the root portions 52, 53 drawn out from the both sides of the clamp member 37 of the leader tape 35 supported by the clamp member 37 engaged with the reel hub 31, the contact portion 75 is formed with a width sufficient to press root portions 52, 53 drawn out from the both sides of the clamp member 37.

On the other hand, the control portion 63 includes, as shown in FIG. 13, a timer section 76 for controlling heating time of the heater 73 of the heater block 66, a heater temperature adjuster 77 for controlling heating temperature of the heater 73, a power switch 78 for controlling switching of the main power, and a start switch 79. In this case, the heater temperature adjuster 77 serves to adjust heating temperature of the heater 73 so as to provide a temperature sufficient to thermally deform the leader tape 35 formed by cutting film sheet of synthetic resin while preventing damage by heat of the reel hub 31 formed as molded body of synthetic resin. In the deforming apparatus 61 of this invention, the heater temperature adjuster 77 serves to adjust heating temperature of the heater 73 within the range of about 60 to 100° C. It is to be noted that heating temperature of the heater 73 controlled by the heater temperature adjuster 77 is suitably variably adjusted in accordance with material constituting the leader tape 35 to be deformed.

The process steps for deforming root portions 52, 53 drawn out from the both sides of the clamp member 37 of the leader tape 35 supported on the reel hub 31 through the clamp member 37 by using the deforming apparatus 61 for tape body constituted as described above to render bending peculiarity thereto will now be described in succession.

Figure 15:
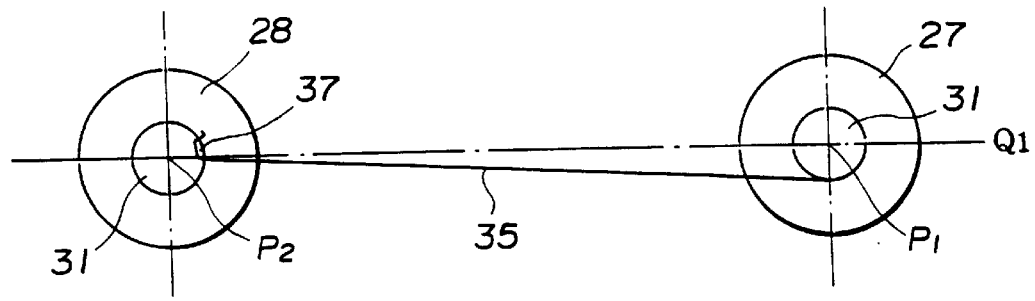
FIG. 15 a plan view of tape reel assembly showing the state where tape reels are mounted on first and second reel tables of tape deforming apparatus.

At the first process step, the leader tape 35 of the tape reel assembling body 60 is wound onto the tape reel 27 or 28 at the side where deformation processing of the root portions 52, 53 is not carried out. In this process step, the entire portion of the leader tape 35 is wound onto one tape reel 27 serving as the supply side. Further, the tape reel 28 for carrying out deformation processing of the root portions 52, 53 is mounted on the first reel table 64, and the tape reel 27 of the side which has wound the leader tape 35 is mounted on the reel table 65. At this time, respective tape reels 28, 27 are mounted in the state where engagement shafts 64a, 65a projected at the central portion of the first and second reel tables 64, 65 are engaged with reel shaft insertion holes 33, 32 provided at the central portions of the reel hub 31. In a manner as stated above, respective tape reels 28, 27 are mounted on the first and second reel tables 64, 65 in the state where the engagement shafts 64a, 65a are engaged with the reel shaft insertion holes 33, 32, whereby they are mounted in the rotation impossible state with respect to respective reel tables 64, 65. When respective tape reels 28, 27 are mounted on the reel tables 64, 65, respective tape reels 28, 27 are disposed with respective centers $P_1$, $P_2$ being caused to be in correspondence with the reference line $Q_1$ as shown in FIG. 15. At this time, the tape reel 28 mounted on the first reel table 64 is placed in the state where the clamp member 37 is opposite to the tape reel 27 mounted on the second reel table 65.

When the start switch 79 is turned ON at the time point when the tape reels 28, 27 are respectively mounted on the reel tables 64, 65, compressed air is delivered from air pump (not shown) to the cylinder portion 67. As a result, cylinder rods 67a are advanced in a direction indicated by arrow G in FIG. 13. Thus, the first reel table 64 connected to the cylinder rods 67a is moved in the direction indicated by arrow G in FIG. 13 which is the direction where the first reel table 64 connected to the cylinder rod 67a becomes closer to the heater block 66 in one body with the cylinder rod 67a. At this time, the heater temperature adjuster 77 is controlled, whereby the heater 73 is subjected to heating control so that temperature becomes equal to substantially 90° C. It is to be noted that heating temperature of the heater 73 is suitably adjusted in accordance with material constituting the leader tape 35 subject to deformation processing or material constituting the reel hub 31.

Figure 16:
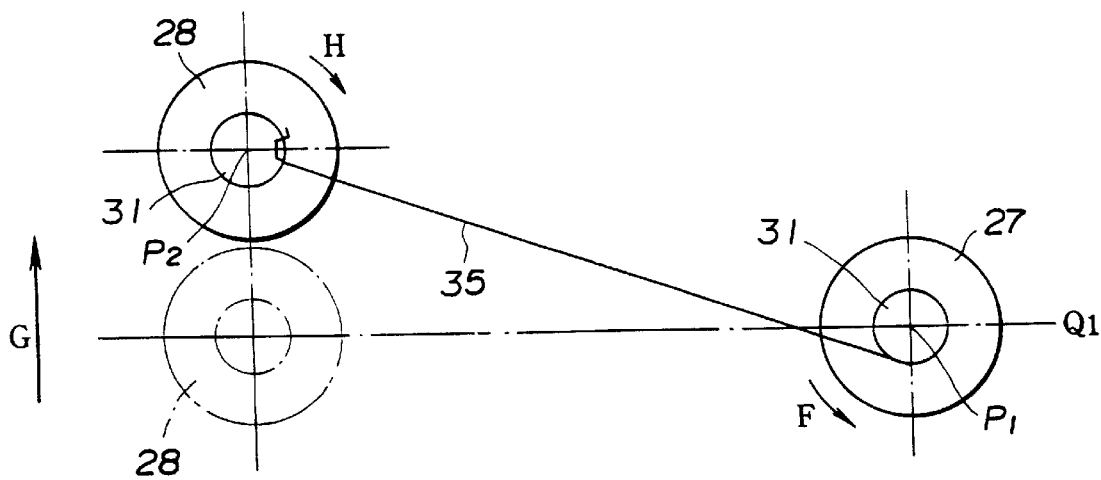
FIG. 16 is a plan view of tape reel assembly body showing the state where tape reel mounted on the first reel table is advanced to the heater block side.

When the first reel table 64 is advanced in the direction indicated by arrow G in FIG. 16 caused to become close to the heater block 66 from the initial position as shown in FIG. 16, the second reel table 65 on which the tape reel 27 where no deformation processing of leader tape 35 is carried out is mounted is placed at the fixed position without changing that position. Moreover, since the second reel table 65 is rotationally biased by the extension spring 68 in a direction indicated by the arrow F in FIG. 16 which is the direction to wind the leader tape 35 wound on the tape reel 27 mounted on the reel table 65, drawing operation of the leader tape 35 from the tape reel 27 is limited. Further, tension is rendered to the leader tape 35 which connects a pair of tape reels 28, 27 mounted on the first and second reel tables 64, 65 in accordance with quantity of movement to the heater block 66 side of the first reel table 64.

Figure 17:
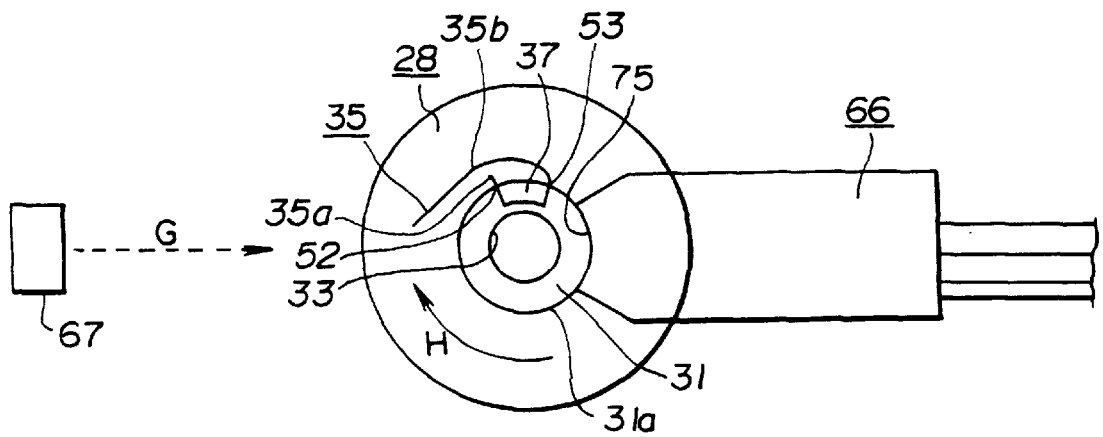
FIG. 17 is a plan view showing the state where heater block is caused to be in pressure contact with the outer circumferential surface of reel hub.

When compressed air is further supplied from the air pump to the cylinder portion 67 from the state where the first reel table 64 is advanced to the heater block 66 side, the first reel table 64 is further moved in the direction indicated by arrow G in FIG. 16. Thus, the contact portion 75 of the heater block 66 comes into pressure contact with the outer circumferential surface 31a of the reel hub 31 of the tape reel 28 mounted on the reel table 64 as shown in FIG. 17. At this time, the first reel table 64 is supported on the heater block 66 so that further movement in the direction indicated by arrow G in FIG. 16 is limited. When compressed air is further supplied from the air pump to the cylinder portion 67 from the state where movement of the first reel table 64 is limited, the first reel table 64 is rotated in a direction indicated by arrow H in FIGS. 16 and 17 in the state supported by the heater block 66.

It is to be noted that, in order to carry out smooth rotation in the direction indicated by arrow H in FIGS. 16 and 17 of the first reel table 64 from the state where the heater block 66 is in pressure contact with the reel hub 31 of the tape reel 28, it is desirable to provide difference between center of the reel hub 31 and center of curvature of the contact portion 75. Namely, center of curvature of the contact portion 75 is shifted toward the side opposite to the rotation direction of the first reel table 64 with respect to the center of the reel hub 31.

Further, when the first reel table 64 is rotated in the state where the heater block 66 is in pressure contact with the reel hub 31 of the tape reel 28, the tape reel 28 is rotated in the state where the outer circumferential surface 31a of the reel hub 31 is traced by the contact portion 75 of the heater block 66 in one body with the first reel body 64.

It is to be noted that the contact initial position of the contact portion 75 of the heater block 66 with respect to the outer circumferential surface 31a of the reel hub 31 is caused to be the position except for the position where the clamp member 37 is attached. This is because the heater block 66 is opposite to the first reel table 64 from a direction perpendicular to the reference line $Q_1$ connecting centers $P_1$, $P_2$ of the respective tape reels 28, 27 located at the initial position.

Further, when the tape reel 28 mounted on the first reel table 64 is rotated in the direction indicated by arrow H in FIGS. 16 and 17 in the state where the contact portion 75 of the heater block 66 is in pressure contact with the outer circumferential surface 31a of the reel hub 31, the root portions 52, 53 projected from the both sides of the clamp member 37 of the leader tape 35 are bent toward the rotational direction of the tape reel 28 by the contact portion 75 of the heater block 66. At this time, the root portions 52, 53 of the leader tape 35 are bent in such a manner elongated in the rotational direction of the tape reel 28 by the contact portion 75 of the heater block 66 moving in the state caused to be in pressure contact with the portion on the leader tape 35, i.e., while being squeezed.

Figure 18:
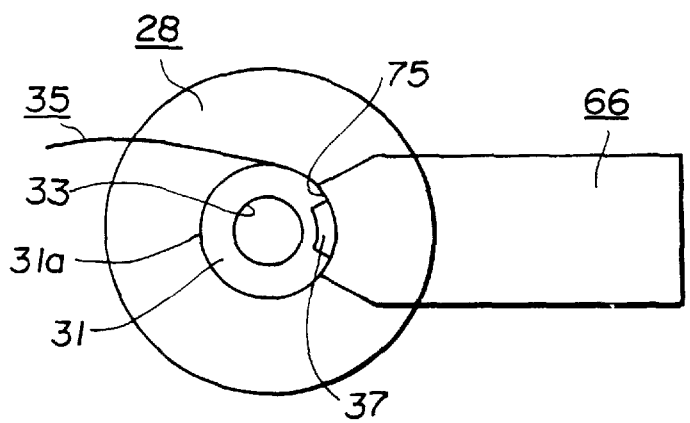
FIG. 18 is a plan view showing the state where heater block presses and supports root portions of leader tape supported on reel hub and the portion on clamp member which supports leader tape.

When rotation of the tape reel 28 is continued so that the contact portion 75 of the heater block 66 reaches the position where the clamp member 37 is covered including the root portions 52, 53 of the leader tape 35 projected from the both sides of the clamp member 37 as shown in FIG. 18, quantity of compressed air delivered from the air pump to the cylinder portion 67 is controlled. As a result, rotation of the first reel table 64 is stopped. Thus, the contact portion 75 of the heater block 66 holds for several seconds, e.g., 2 seconds the state caused to be in pressure contact with the clamp member 37 so as to include the root portions 52, 53 of the leader tape 35. As stated above, since the root portions 52, 53 of the leader tape 35 are heated after they are bent while being squeezed by the contact portion 75 of the heater block 66, degree of bending is permitted to be great (can be increased). As a result, it is possible to suppress elastic (resilient) return force of the root portions 52, 53 of the leader tape 35 bent while being squeezed. Thus, it is possible to securely hold the bending peculiarity.

The heat treatment of the root portions 52, 53 of the leader tape 35 may be carried out from the state where the contact portion 75 of the heater block 66 presses the root portions 52, 53, or may be such that the heater block 66 is heated from the time point before the contact portion 75 of the heater block 66 presses the root portions 52, 53 to squeeze the leader tape 35 in the heated state. Also in the case where the leader tape 35 is squeezed in the heated state as described above, it is desirable for securely holding the bending peculiarity to heat the root portions 52, 53 of the leader tape 35 in the state where those root portions are pressed by the heater block 66.

When heat treatment of the root portions 52, 53 of the leader tape 35 by the heater block 66 is completed, the cylinder rod 67a of the cylinder portion 67 is caused to undergo biasing force of returning biasing means (not shown) so that it is returned to the initial position. When the cylinder rod 67a is returned to the initial position, the first reel table 64 is also returned to the initial position. Thus, deformation process of the leader tape 35 is completed.

Figure 19:
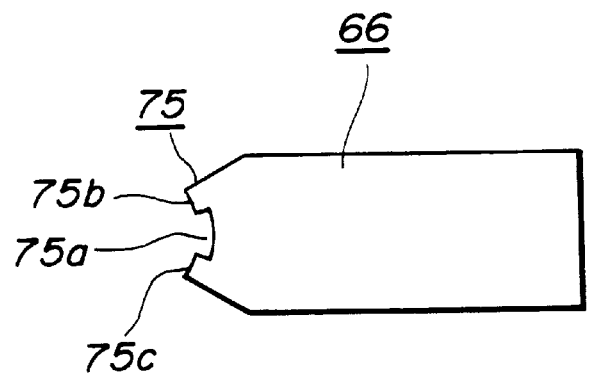
FIG. 19 is a plan view showing another example of heater block.

Meanwhile, as the contact portion 75 to the reel hub 31 constituted at the front end portion side of the heater block 66, if the contact portion has a shape capable of rendering bending peculiarity to the root portions 52, 53 drawn out from the both sides of the clamp member 37 of the leader tape 35 supported by the clamp member 37 engaged with the reel hub 31, various kinds of contact portions may be used. For example, the contact portion 75 may be as shown in FIG. 19 such that a cut recessed portion 75a is provided at the central portion to form, on the both sides of the cut recessed portion 75a, pressing portions 75b, 75c which press the root portions 52, 53 of the leader tape 35 so as to include the both sides of the clamp member 37.

Figure 20:
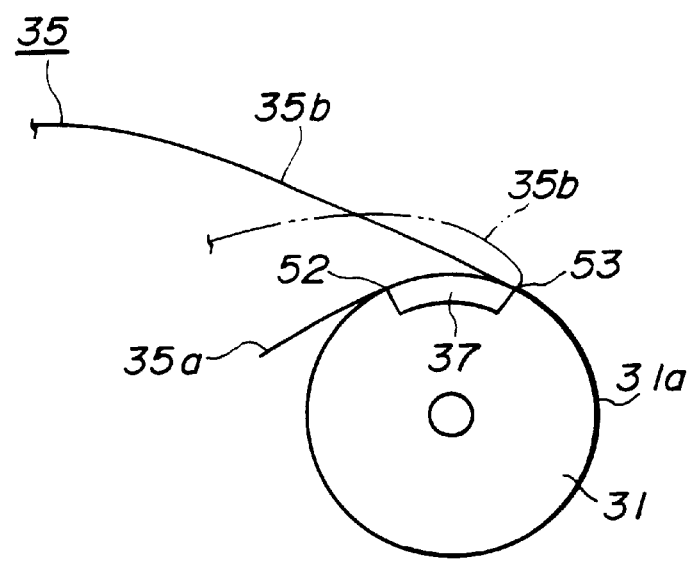
FIG. 20 is a plan view showing the state where bending peculiarity is implemented to root portions of leader tape supported on reel hub.

The root portions 52, 53 drawn out from the both sides of the clamp member 37 of the leader tape 35 to which deformation processing has been implemented as described above are adapted so that even after they are detached from the deforming apparatus 61, the bending peculiarity such that they are bent so as to take an acute angle in the tangential direction of the outer circumferential surface 31a of the reel hub 31 is rendered as shown in a FIG. 20.

While it has been described that the root portions 52, 53 of the leader tape 35 connected to the tape reel 28 side serving as the winding side of the tape body 36 are caused to undergo bending deformation, root portions 52, 53 of the leader tape 35 connected to the tape reel 27 side serving as the supply side may be caused to undergo bending deformation. By allowing the leader tape 35 connected to the tape reel 27 side serving as the supply side to also have the bending peculiarity in this way, it is possible to suppress deformation of the tape body 36 wound on the tape reel 27. In order to allow the root portions 52, 53 of the leader tape 35 of both tape reel 27, 28 sides to undergo bending deformation, it is sufficient to implement deformation processing to one tape reel 28 side thereafter to mount the other tape reel 27 on the first reel table 64 side to carry out processing as previously described.

Figure 21:
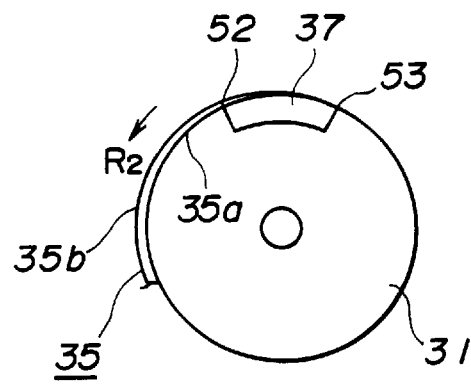
FIG. 21 is a plan view showing the state where the leader tape in which bending peculiarity has been implemented to the root portions is wound on the outer circumferential surface of reel hub.
Figure 22:
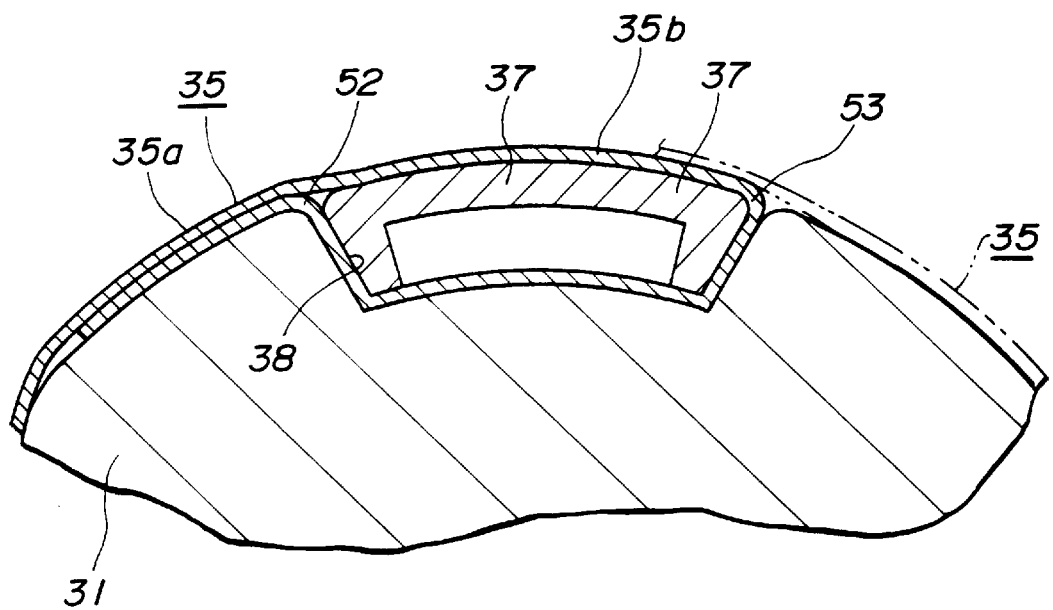
FIG. 22 is an essential part plan view showing the state where the leader tape in which bending peculiarity has been implemented to root portions is wound on clamp member.

As described above, the leader tape 35 in which bending deformation processing has been implemented to the root portions 52, 53 is wound in a direction indicated by arrow $R_2$ in FIG. 21 on the outer circumferential surface 31a of the reel hub 31 in the state where the connecting portion 35b side to which the magnetic tape 26 is connected is extended onto the clamp member 37, and is further stacked on the free end portion 35a side. At this time, since the leader tape 35 is adapted so that such a bending peculiarity bent so as to take an acute angle in the tangential direction of the outer circumferential surface 31a of the reel hub 31 is implemented to the root portions 52, 53 located at the both sides of the clamp member 37, this leader tape 35 is wound following the outer circumferential surface 31a in the state closely in contact with the outer circumferential surface 31a of the reel hub 31 as shown in FIG. 22. Namely, occurrence of projection projected toward the outward of the outer circumferential surface 31a of the reel hub 31 at the root portions 52, 53 of the leader tape 35 is prevented.

Since such a bending peculiarity of acute angle to extend in the tangential direction of the outer circumferential surface 31a of the reel hub 31 is implemented to the root portions 52, 53 of the leader tape 35 projected from the both sides of the clamp member 37 as described above, when the leader tape 35 is wound onto the reel hub 31 as shown in FIG. 22, it is wound in the state where occurrence of swollen portion toward the outward of the outer circumferential surface 31 is prevented at the both sides of the clamp member 37.

Namely, the leader tape 35 is adapted so that occurrence of gap between the leader tape 35 and the outer circumferential surface of the clamp member 37 or the outer circumferential surface 31a of the reel hub 31 is suppressed at one root portion 52 where the free end 35a side is projected from the clamp member 37 and the other root portion 53 where the connecting portion 35b side to which the magnetic tape 26 is connected is projected from the clamp member 37. Thus, it is possible to eliminate occurrence of projection projected toward the outward from the outer circumferential surface 31a of the reel hub 31. Accordingly, the leader tape 35 is wound in the state closely in contact with the outer circumferential surface 31a of the reel hub 31. As the result of the fact that the leader tape 35 is wound on the outer circumferential surface 31a of the reel hub 31 in a manner to be closely in contact therewith as stated above, the magnetic tape 26 connected to the leader tape 35 and wound on the leader tape 35 is wound onto the reel hub 31 in such a manner to form winding shape of complete round in the state where a portion is not caused to be eccentric with center of the reel hub 31 being as center. Namely, the magnetic tape 26 is prevented from undergoing unfavorable phenomenon such that it is wound on the outer circumferential surface 31a of the reel hub 31 in the state where its middle portion is deformed.

Since the leader tape 35 is adapted in the above-described example so that its middle portion is supported by the clamp member 37 so that it is attached on the reel hub 31, the free end 35a side and the connecting portion 35b side of the magnetic tape 26 are projected toward the outer circumferential surface side of the outer circumferential surface 31a of the reel hub 31 from the both sides of the clamp member 37. However, there may be employed a leader tape such that the free end 35a side is held without projecting the free end 35a side toward the outer circumferential surface 31a of the reel hub 31.

Moreover, in a tape reel in which the leader tape 35 is supported in such a manner to project the free end 35a toward the outer circumferential surface 31a of the reel hub 31, a recessed portion corresponding to width of the leader tape 35 may be provided at the outer circumferential surface 31a portion of the reel hub 31 where the free end 35a extends so that no offset takes place at the end portion of the free end 35a side when the leader tape 35 is stacked on the free end 35a. Further, a shaved portion corresponding to width of the leader tape 35 may be provided at the portion extending from the side surface to the outer circumferential surface of the clamp member 37 from which the connecting portion 35b side of the leader tape 35 is drawn out to avoid swelling by overlap of the leader tape 35.

The leader tape 35 which connects a pair of tape reels 27, 28 constituting tape reel assembling body 60 in which bending peculiarity is rendered to the root portions 52, 53 projected from the clamp member 37 of the leader tape 35 as described above is cut, and the magnetic tape 26 is connected between connecting portions 35b extended from the respective tape reels 27, 28. The magnetic tape 26 connected through the leader tape 35 is wound with respect to the tape reel 27 side serving as the supply side. A pair of tape reels 27, 28 which have wound the magnetic tape 26 thus connected with respect to the tape reel 27 side serving as the supply side in a manner as stated above are accommodated within the previously described cassette body 25 to constitute tape cassette 21.

Figure 23:
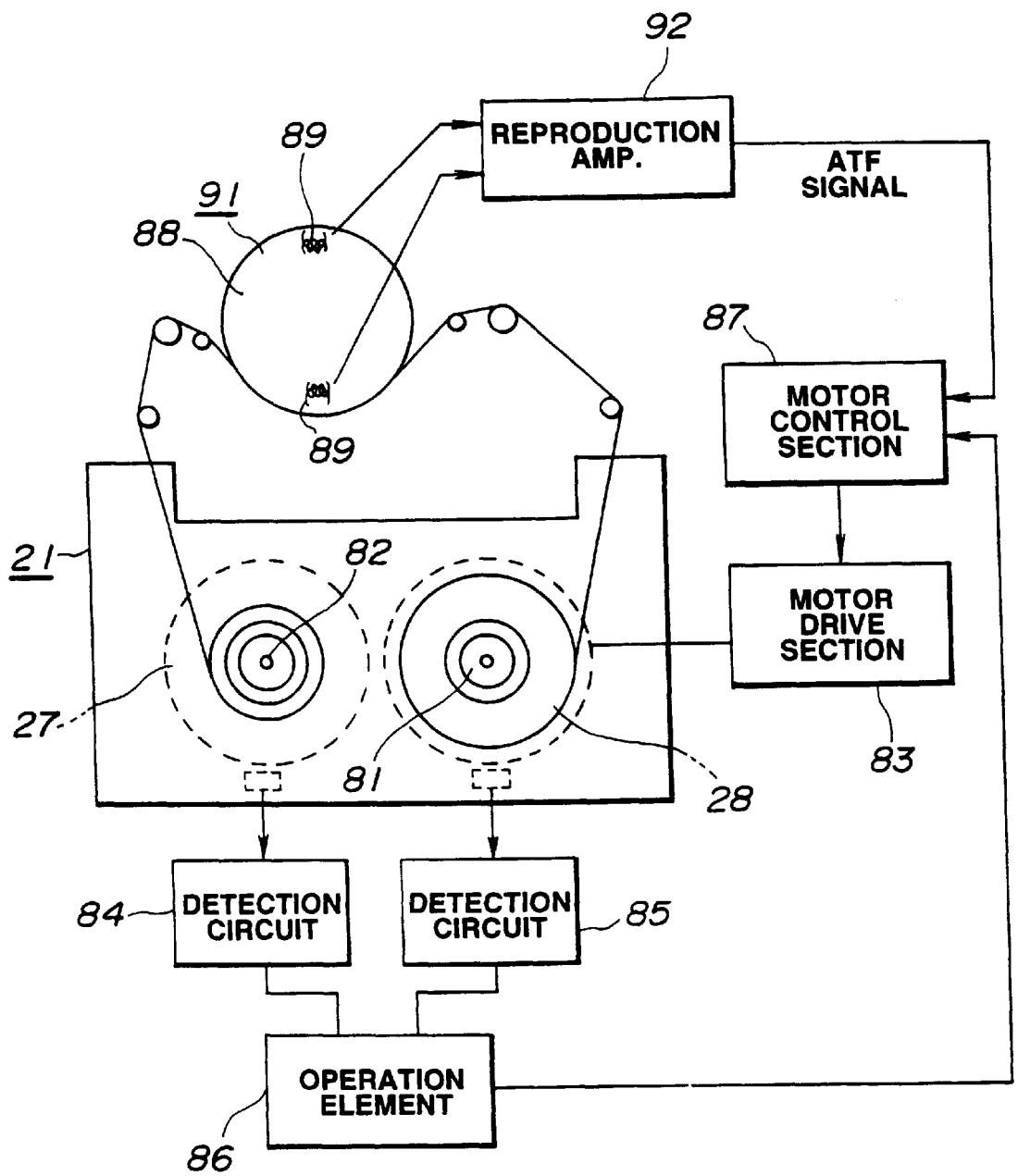
FIG. 23 is a block diagram showing a recording and/or reproducing apparatus of the reel drive system into which a tape cassette according to this invention is loaded.

A recording/reproducing apparatus using the tape cassette 21 as a recording medium will now be described. This recording/reproducing apparatus is used as an external memory (storage) unit for information processing equipment such as computer, etc. and employs the reel drive system of rotationally driving, by means of a drive motor, tape reel 28 serving as the winding side of the magnetic tape 26 without provision of constant velocity traveling operation means for the magnetic tape by the capstan and the pinch roller to thereby realize constant velocity traveling of the magnetic tape 26. This recording/reproducing apparatus includes, as shown in FIG. 23, a pair of reel drive shafts 81, 82 engaged with reel hubs 31, 31 of tape reels 27, 28 accommodated within the tape cassette 21 and respectively rotationally driven by drive motor (not shown) which rotationally operate the tape reels 27, 28, a motor drive section 83 for rotationally driving the drive motor which rotationally drive respective reel drive shafts 81, 82, detection circuits 84, 85 for detecting winding state of the magnetic tape 26 wound on the respective tape reels 27, 28, an operation element 86 for determining, by operation, sum of rotation periods of the respective tape reels 27, 28 of which rotation speeds are adjusted in dependency upon winding state of the magnetic tape 26, and a motor control section 87 supplied with an output from the operation element 86 to control the motor drive section 83 on the basis of the input signal so that sum of rotation periods of respective tape reels 27, 28 becomes constant. Further, this recording/reproducing apparatus comprises a rotation magnetic head unit 91 including a rotation drum 88 on which the magnetic tape 26 drawn out from the tape cassette 21 is wound, and magnetic heads 89 slidably in contact with the magnetic tape 26 traveling in the state wound on the rotation drum 88 and adapted for carrying out recording and/or reproduction of data with respect to the magnetic tape 26. Moreover, the recording/reproducing apparatus comprises a reproduction amplifier 92 for generating, as an amplifier output, an automatic tracking control signal (ATF signal), which conducts a control so that the magnetic head 89 precisely scans recording tracks formed on the magnetic tape 26, on the basis of signals outputted from the magnetic heads 89 at the time of reproduction to input this ATF signal to the motor control section 87. When the automatic tracking control signal is inputted, the motor control section 87 outputs a control signal in accordance with scanning position of the recording track of the magnetic head 89 to control the motor drive section 83 to control rotational speeds of the respective tape reels 27, 28 to conduct a control so that the magnetic head 89 precisely scans the recording tracks formed on the magnetic tape 26.

The recording/reproduction apparatus constituted as described above is operative at the time of recording/reproduction of data to control rotational speed of the drive motor which rotationally operates the tape reel 28 serving as the winding side in accordance with rotation periods of the respective tape reels 27, 28, thus to realize constant velocity traveling of the magnetic tape 26.

By using the tape cassette 21 according to this invention in such a recording/reproducing apparatus employing the reel drive system, it is possible to securely carry out stable traveling of the magnetic tape 26. Namely, since the tape cassette 21 according to this invention is such that bending peculiarity is rendered to the root portions 52, 53 of the leader tape 35 to which the magnetic tape 26 is connected to deform them, the leader tape 35 is permitted to be wound thereon in the state closely in contact with the outer circumferential surface 31a of the reel hub 31 without allowing large projection to take place. In this case, the magnetic tape 26 wound on the leader tape 35 is wound on the reel hub 31 in such a manner to form winding shape of complete round in the state where winding center is caused to be in correspondence with center of the reel hub 31. For this reason, the magnetic tape 26 is drawn out from the tape reel 27 of the supply side and is traveled in the state caused to be precisely in correspondence with rotation velocities of respective tape reels 27, 28. Namely, the magnetic tape 26 is precisely traveled in the state where linear velocity is caused to be constant at all times. Since traveling of the magnetic tape 26 is realized without fluctuating drawing velocity from the tape reel 27 of the supply side in this way, it is possible to precisely carry out control of traveling of the magnetic tape 26. Thus, it is possible to carry out satisfactory data recording and/or reproduction.

Moreover, also in the case where the tape cassette 21 according to this invention is used in the recording/reproducing apparatus of the capstan drive system, deformed portion does not take place at a portion of the magnetic tape 26. Accordingly, stable traveling of the magnetic tape 26 is realized. In addition, precise slide contact between the magnetic head and the magnetic tape 26 is realized, whereby satisfactory data recording and/or reproduction can be realized.

It is to be noted that the way of thinking of this invention to render bending peculiarity to root portions 52, 53 of the leader tape 35 to which the magnetic tape 26 is connected and the configuration therefor are applied to an attachment structure for tape body in which the end portion of the tape body is held on the reel hub to wind the tape body and a tape cassette provided with such an attachment structure, thereby making it possible to wind, on the reel hub, tape body on which information signals are recorded such as magnetic tape, etc. without deforming it. Further, the tape body is prevented from undergoing winding in such state that any projection is caused to take place at a portion of the circumferential direction of the reel hub. Thus, the tape body can be wound maintaining precisely complete round state with respect to the reel hub.

In accordance with this invention, since bending peculiarity in the direction along the winding plane surface is rendered to the root portion in the vicinity of the holding portion of the tape body held by the tape reel to deform it, the tape body can be wound so as to form winding shape of complete round in the state where winding center is caused to be in correspondence with center of the tape reel. Accordingly, it is possible to carry out drawing operation of the tape body in the state where drawing velocity from the tape reel is caused to be constant at all times.

Since tape cassette which can maintain drawing velocity of the tape body constant can be constituted by using such supporting structure for tape body, when this tape cassette is loaded into the recording/reproducing apparatus to carry out recording and/or reproduction of data, stable traveling of the tape body is realized. Thus, stable recording and/or reproduction of information signals are realized.

We claim:

1. A method for attachment of a tape body onto a tape reel, comprising the steps of:

attaching a clamp member on a reel hub provided at a central portion of the tape reel with an end portion of the tape body between the clamp member and the reel hub to allow the reel hub to support thereon an end portion of the tape body wound around an outer circumferential surface of the reel hub, deforming a base end portion of a supporting portion side of the tape body onto the reel hub while pressing the base end portion at a fixed pressure to the reel hub by pressing means, and pressing the base end portion of the tape body to the outer circumferential surface of the reel hub in a winding direction for a predetermined time while the base end portion of the tape body is heated to deform said base end portion in a winding direction of the reel hub so as to follow the outer circumferential surface of the reel hub.

2. A method for attachment of a tape body onto a tape reel as set forth in claim 1 further comprising the step of, rotating the tape reel while pressing a position thereof spaced from the base end portion of the tape body supported on the reel hub by the clamp member toward the reel hub by the pressing means to deform the base end portion of the tape body.

3. A method for attachment of a tape body onto a tape reel as set forth in claim 2, wherein the position spaced from the base end portion of the tape body is heated while pressing the base end portion toward the reel hub by the pressing means.

4. A method for attachment of a tape body onto a tape reel as set forth in claim 1, wherein the pressing means comprises heating means for heating the tape body, and a pressing surface side is formed thereon so as to take a shape of a curved surface defined as a recess-shaped portion shaped in correspondence with a curvature of the outer circumferential surface of the reel hub.

5. A method for attachment of a tape body onto a tape reel as set forth in claim 4, wherein a front end portion of the pressing means which presses the tape body onto the reel hub is dimensioned so as to cover an outer circumferential surface of the clamp member attached to the reel hub and a side portion of the tape body withdrawn from the reel hub.

6. A method for attachment of a tape body onto a tape reel as set forth in claim 5, wherein a recessed portion is formed at a position opposite to the clamp member at the front end portion of the pressing means.

* * * * *